United States Patent
Zhong et al.

(10) Patent No.: US 9,216,696 B2
(45) Date of Patent: Dec. 22, 2015

(54) DEVICE FOR VEHICLE-MOUNTED EQUIPMENT AND VEHICLE HAVING THE SAME

(71) Applicants: SHENZHEN BYD AUTO R&D COMPANY LIMITED, Shenzhen, Guangdong (CN); BYD COMPANY LIMITED, Shenzhen, Guangdong (CN)

(72) Inventors: Yilin Zhong, Guangdong (CN); Junming Bai, Guangdong (CN); Jun Dai, Guangdong (CN); Meng Wang, Guangdong (CN)

(73) Assignees: Shenzhen BYD Auto R&D Company Limited, Shenzhen (CN); BYD Company Limited, Shenzhen (CN)

( * ) Notice: Subject to any disclaimer, the term of this patent is extended or adjusted under 35 U.S.C. 154(b) by 0 days.

(21) Appl. No.: 14/286,917

(22) Filed: May 23, 2014

(65) Prior Publication Data

US 2014/0265410 A1 Sep. 18, 2014

Related U.S. Application Data

(63) Continuation of application No. PCT/CN2012/085063, filed on Nov. 22, 2012.

(30) Foreign Application Priority Data

Nov. 24, 2011 (CN) ...................... 2011 2 0472474 U

(51) Int. Cl.
*B60R 7/06* (2006.01)
*B60R 11/02* (2006.01)
(Continued)

(52) U.S. Cl.
CPC . *B60R 7/06* (2013.01); *B60R 11/02* (2013.01); *F16H 19/08* (2013.01); *B60R 2011/0082* (2013.01); *B60R 2011/0092* (2013.01); *Y10T 74/18568* (2015.01); *Y10T 74/18792* (2015.01)

(58) Field of Classification Search
CPC ...... B60R 7/06; B60R 11/02; B60R 11/0229; B60R 11/0235; B60R 11/0258; B60R 2011/0082; B60R 2011/0084; B60R 2011/0092
USPC .............................................. 296/37.8, 37.12
See application file for complete search history.

(56) References Cited

U.S. PATENT DOCUMENTS 5,184,489 A * 2/1993 Squires et al. ..................... 70/58
5,460,309 A * 10/1995 Nehl et al. ..................... 224/281
(Continued)

FOREIGN PATENT DOCUMENTS

CN 1513698 A 7/2004
CN 101395036 A 3/2009
(Continued)

OTHER PUBLICATIONS

PCT International Search Report and Written Opinion mailed Mar. 7, 2013, issued in International Application No. PCT/CN2012/085063 (13 pages).

*Primary Examiner* — Gregory Blankenship
(74) *Attorney, Agent, or Firm* — Finnegan, Henderson, Farabow, Garrett & Dunner, LLP

(57) ABSTRACT

A device for moving a vehicle-mounted object and a vehicle having the same are provided. The device comprises a housing with an opening, a cover frame mounted on the housing, a cover with a surface for mounting the vehicle-mounted object thereon, the cover being coupled with the cover frame and being capable of pivoting to either expose or cover at least a part of the opening, and a platform slidably fitted within the housing, being coupled with the cover and movable between a first position to cause the cover to pivot to expose at least a part of the opening, and a second position to cause the cover to pivot to cover at least a part of the opening.

18 Claims, 4 Drawing Sheets

(51) Int. Cl.
*F16H 19/08* (2006.01)
*B60R 11/00* (2006.01)

(56) References Cited

U.S. PATENT DOCUMENTS

| | | | |
|---|---|---|---|
| 8,141,759 B2* | 3/2012 | Lota et al. | 224/483 |
| 8,454,073 B2* | 6/2013 | Grandel et al. | 296/37.12 |
| 8,910,990 B1* | 12/2014 | Oldani et al. | 296/37.8 |
| 2002/0101091 A1* | 8/2002 | Ito | 296/37.12 |
| 2006/0066120 A1* | 3/2006 | Svenson et al. | 296/37.12 |
| 2006/0108820 A1* | 5/2006 | Vican | 296/37.12 |
| 2009/0085366 A1* | 4/2009 | Doom et al. | 296/37.12 |
| 2012/0049558 A1* | 3/2012 | Souillac | 296/37.12 |
| 2014/0265410 A1* | 9/2014 | Zhong et al. | 296/37.12 |
| 2014/0338479 A1* | 11/2014 | Zhong et al. | 74/89.16 |
| 2014/0354002 A1* | 12/2014 | Bisceglia et al. | 296/37.12 |

FOREIGN PATENT DOCUMENTS

| | | |
|---|---|---|
| CN | 102005163 A | 4/2011 |
| CN | 202368491 U | 8/2012 |
| JP | H 8-156710 A | 6/1996 |
| JP | 2003-054322 A | 2/2003 |
| WO | WO 2013/075646 A1 | 5/2013 |

\* cited by examiner

DEVICE FOR VEHICLE-MOUNTED EQUIPMENT AND VEHICLE HAVING THE SAME

CROSS-REFERENCE TO RELATED APPLICATION

This application is a continuation application of International Application No. PCT/CN2012/085063, filed on Nov. 22, 2012, which claims priority to and benefits of Chinese Patent Application No. 201120472474.8, filed with the State Intellectual Property Office of China (SIPO) on Nov. 24, 2011. The entire contents of the above-reference applications are incorporated herein by reference.

FIELD

The present disclosure relates to the field of flip device, particularly, to a flip device for vehicle-mounted equipment and a vehicle having such a flip device.

BACKGROUND

At present, more equipment is mounted inside a vehicle. Most of the conventional vehicle-mounted equipment is fixed on the dashboard of a vehicle directly. For example, a night vision system is either integrated into a DVD-playing device which is not part of the dashboard, or is directly fixed external to the dashboard of the vehicle. Therefore, such vehicle-mounted equipment, being inflexibly mounted inside the vehicle, can obstruct the driver's view or reduce comfort for the driver or other passengers when not in use. Besides, such an arrangement also affects the aesthetic of the interior of the vehicle, since the vehicle-mounted equipment cannot be inosculated with the interior of the vehicle. Therefore, there is a need for a device to flip and display the equipment, or to allow the equipment to extend out of the dashboard, when the equipment is needed, and to fold and conceal the equipment into the dashboard when the equipment is not needed.

SUMMARY

An object of embodiments of the present disclosure is to provide a flip device for vehicle-mounted equipment, in which the flip device may cause the vehicle-mounted equipment to extend out of the dashboard and to flip and fold into the dashboard.

Another object of embodiments of the present disclosure is to provide a vehicle having the above mentioned flip device for vehicle-mounted equipment.

According to an embodiment of the present disclosure, a device for moving a vehicle-mounted object comprises: a housing with an opening; a cover frame mounted on the housing; a cover with a surface for mounting the vehicle-mounted object thereon, the cover being coupled with the cover frame and being capable of pivoting to either expose or cover at least a part of the opening; and a platform slidably fitted within the housing, being coupled with the cover and movable between a first position to cause the cover to pivot to expose at least a part of the opening, and a second position to cause the cover to pivot to cover at least a part of the opening.

According to an embodiment of the present disclosure, the device further comprises a power assembly comprising a power unit disposed at a bottom of the housing; and a transmission disposed at the bottom of the housing and comprising an input end coupled with the power unit and an output end coupled with the platform. In some embodiments, the transmission comprises: a worm coupled with the power unit; a first gear to mesh with the worm; a third gear coaxial with the first gear, wherein the first and third gears are disposed at the input end of the transmission; a second gear to mesh with the third gear; and a fourth gear coaxial with the second gear, wherein the second and fourth gears are disposed at the output end of the transmission. In some embodiments, the platform comprises a gear rack to mesh with the fourth gear.

In some embodiments, a first sidewall of the housing comprises a groove, and wherein an edge of the platform is slidably fitted within the groove. In some embodiments, the platform further comprises a bracket comprising a second sidewall, and a first plate being coupled with the bracket and facing the second sidewall of the bracket.

In some embodiments, the platform further comprises a guiding structure, wherein the cover comprises a guiding column structure to slidably fit within the guiding structure, and wherein the platform is configured to cause the cover to pivot via a motion of the guiding column structure within the guiding structure. In some embodiments, the platform further comprises a position-limiting structure connected to the guiding structure to form a guiding and position-limiting structure. In some embodiments, the guiding and position-limiting structure comprises a hole formed on the first plate of the platform. In some embodiments, the hole comprises a first hole portion and a second hole portion connected to and forming an angle with the first hole portion. In some embodiments, the hole further comprises a circular arc transition between the first hole portion and the second hole portion. In some embodiments, the guiding column structure comprises a guide column having a first end coupled with the cover, and a second end extending out of a side of the cover to slidably fit in the hole of the platform.

In some embodiments, the cover frame comprises a pin hole on a side of the cover frame; and the cover comprises a pin on a side of the cover to be fitted in the pin hole of the cover frame, wherein the cover is capable of pivoting around the pin.

According to another embodiment of the present disclosure, a vehicle comprises: a dashboard with an opening; and a device for moving a vehicle-mounted object, comprising: a housing; a cover frame mounted on the housing; a cover with a surface for mounting the vehicle-mounted object thereon, the cover being coupled with the cover frame and being capable of pivoting to either expose or cover at least a part of the opening; and a platform slidably fitted within the housing and being coupled with the cover, the platform being movable between a first position to cause the cover to pivot to expose at least a part of the opening, and a second position to cause the cover to pivot to cover at least a part of the opening.

In some embodiments of a vehicle according to the present disclosure, a surface of the cover frame of the device forms a surface integral to the dashboard. In some embodiments of a vehicle according to the present disclosure, a surface of the cover of the device forms a surface integral to the cover frame of the device.

In some embodiments of a vehicle according to the present disclosure, the device further comprises a power assembly comprising: a power unit disposed at a bottom of the housing; and a transmission disposed at the bottom of the housing and comprising an input end coupled with the power unit and an output end coupled with the platform. In some embodiments, the platform further comprises a gear to engage with the transmission and a guiding structure, wherein the cover comprises a guiding column structure to slidably fit in the guiding structure of the platform, and wherein the cover is pivotably mounted in the cover frame, and wherein the platform is configured to cause the cover to pivot via a motion of the guiding column structure within the guiding structure.

According to another embodiment of the present disclosure, a vehicle comprises a dashboard with an opening and a device for moving a vehicle-mounted object, which comprises: a housing; a cover with a surface for mounting the vehicle-mounted object thereon, the cover being coupled with the housing and being capable of pivoting to either expose or cover at least a part of the opening; and a platform slidably fitted within the housing and being coupled with the cover, the platform being movable between a first position to cause the cover to pivot to expose at least a part of the opening, and a second position to cause the cover to pivot to cover at least a part of the opening.

In some embodiments of a vehicle according to the present disclosure, a surface of the cover of the device forms a surface integral to the dashboard. In some embodiments of a vehicle according to the present disclosure, the device further comprises a power assembly comprising: a power unit disposed at a bottom of the housing; and a transmission disposed at the bottom of the housing and comprising an input end coupled with the power unit and an output end coupled with the platform; wherein the platform further comprises: a gear to engage with the transmission; and a guiding structure; wherein the cover comprises a guiding column structure to slidably fit in the guiding structure of the platform; and wherein the cover is pivotably coupled with the housing; and wherein the platform is configured to cause the cover to pivot via a motion of the guiding column structure within the guiding structure.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the disclosure will become apparent and more readily appreciated from the following descriptions taken in conjunction with the drawings in which.

DETAILED DESCRIPTION

Figure 1:
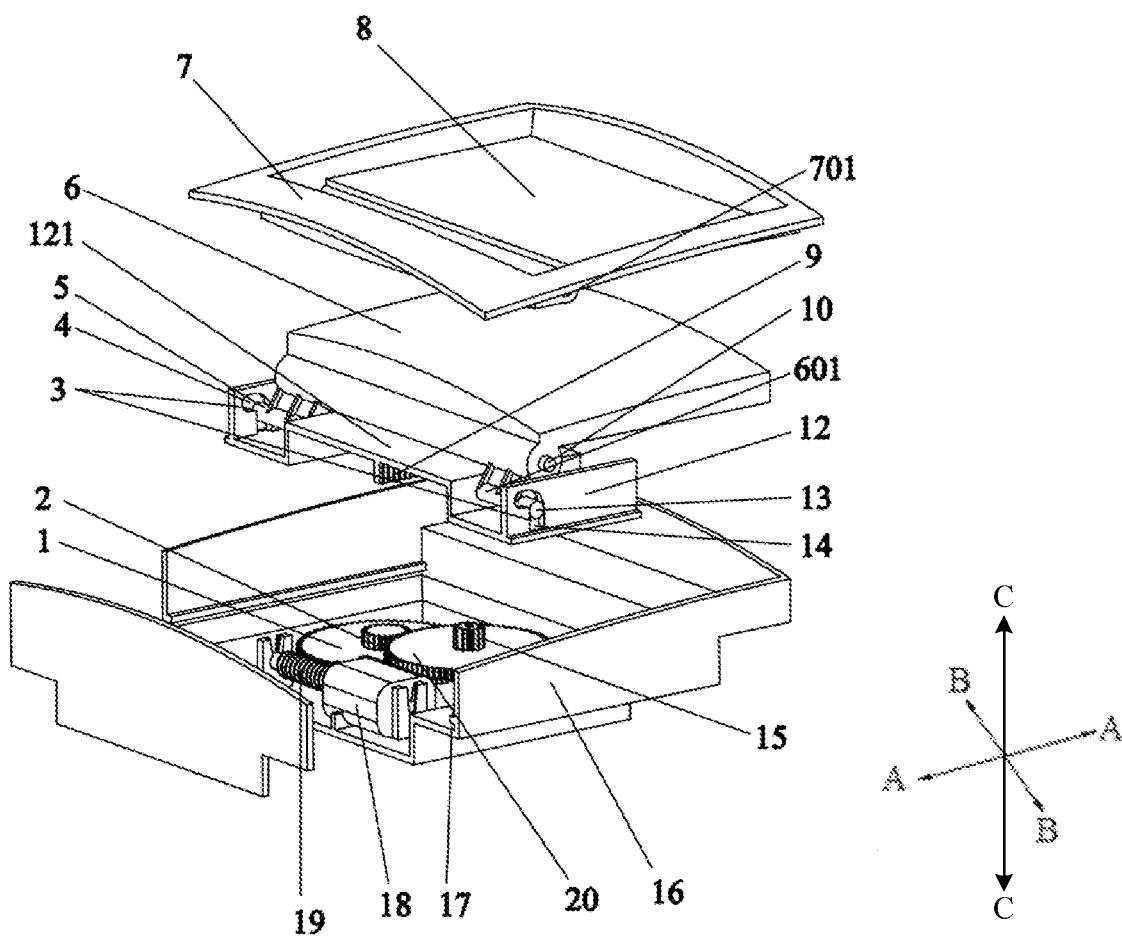
FIG. 1 illustrates a three-dimensional exploded perspective view of a flip device for vehicle-mounted equipment, according to an embodiment of the present disclosure.

Reference will be made in detail to embodiments of the present disclosure, and the embodiments described herein are shown in drawings, in which the same or similar elements and the elements having same or similar functions are denoted by like reference numerals throughout the descriptions.

In the specification, it is to be understood that an orientation or position relations referred by relative terms such as "central", "longitudinal", "lateral", "front", "rear", "right", "left", "inner", "outer", "lower", "upper", "horizontal", "vertical", "above", "below", "up", "top", "bottom", "clockwise" and "counterclockwise" as well as derivative thereof should be construed to refer to the orientation or position relations as then described or as shown in the drawings under discussion. These relative terms are for convenience of description and do not require that the present disclosure be constructed or operated in a particular orientation.

In addition, terms such as "first" and "second" are used herein for purposes of description and are not intended to indicate or imply relative importance or significance. Therefore, a feature defined with "first", "second" may explicitly or implicitly include one or more of the feature. In the specification, unless specified or limited otherwise, "plural" infers two or more.

In the specification, unless specified or limited otherwise, the terms "mounted," "connected," "joined," and "fixed," and variations thereof are used broadly, for example, it may encompass both fixed connections and detachably connections, both mechanical connections and electrical connections, both direct mountings and indirect mountings through intermediate media, and may encompass the internal connectivity of two elements. For the person with ordinary skill in the art, the specific meaning of the above terms in the present invention may be understood according to the specific circumstances.

FIG. 1 illustrates a three-dimensional exploded view of a flip device for vehicle-mounted equipment, according to embodiments of the present disclosure. Arrow A shows a first direction (e.g. front and back), arrow B shows a second direction (e.g. lateral), and arrow C shows a third direction (e.g. top and bottom). The flip device comprises a housing 16, a cover frame 7, a cover 6, a slide mechanism 12 and a power assembly 2. A person with ordinary skill in the art will appreciate that while "vehicle-mounted equipment" is referred to here, the device can be used for other vehicle-mounted objects. Also, although a rectangular plate is shown for cover 6, a person with ordinary skill in the art will appreciate that cover 6 can take on various shapes and can include curved surfaces, and should not be construed to be limited to a rectangular plate.

In some embodiments, housing 16 includes a receiving chamber and an opening. Housing 16 can be adapted to be mounted in a dashboard of a vehicle. In some embodiments, cover frame 7 is fixed on one side, for example the top, of housing 16 to surround the opening, and includes a receiving hole 8 for receiving cover 6.

Figure 2:
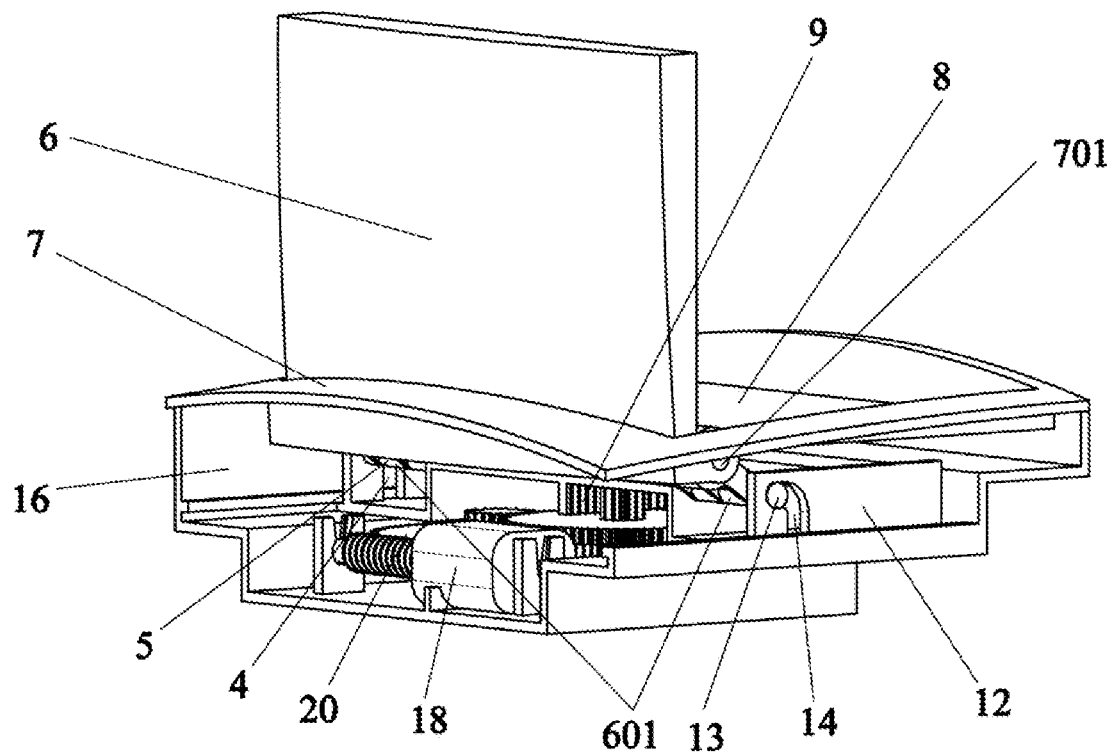
FIG. 2 illustrates a three-dimensional view of a flip device for vehicle-mounted equipment, according to an embodiment of the present disclosure.
Figure 3:
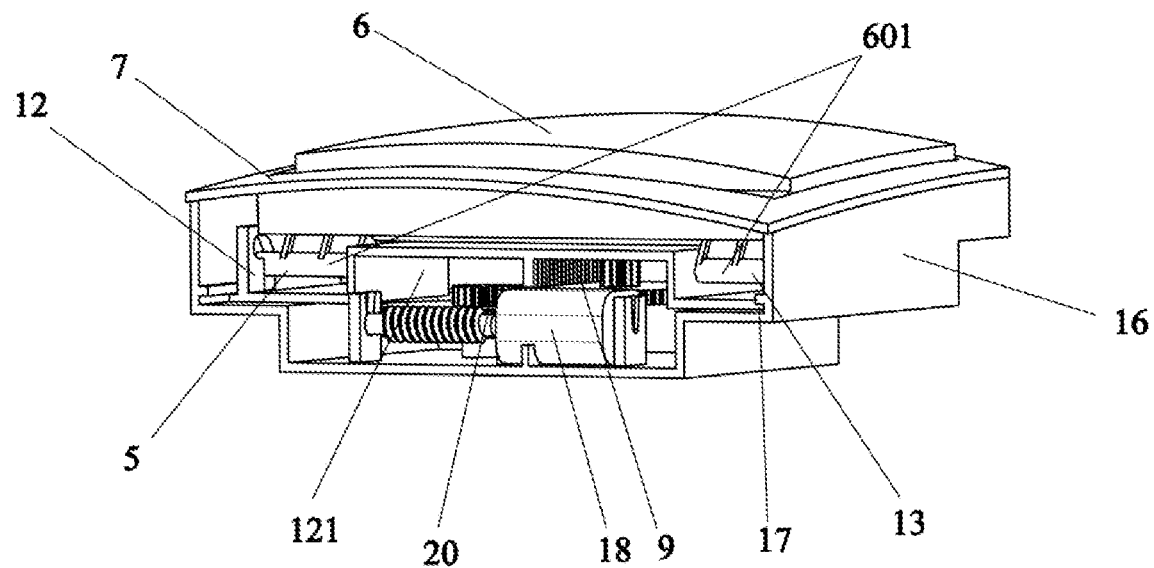
FIG. 3 illustrates another three-dimensional view a schematic view of a flip device for vehicle-mounted equipment, according to an embodiment of the present disclosure.

In some embodiments, cover 6 may include a mounting bracket to mount the vehicle-mounted equipment (not shown) thereon. For example, the vehicle-mounted equipment may be a screen of a vehicle-mounted night vision system, a display device, or a vehicle-mounted TV. Referring to FIG. 2 and FIG. 3, both of which illustrate a three-dimensional view of a flip device for vehicle-mounted equipment according to embodiments of the present disclosure, a portion adjacent to a first end of cover 6 is pivotably mounted onto the cover frame 7, and cover 6 is rotatable between a first position to expose at least part of a surface of cover 6, as shown in FIG. 2, and a second position to cover at least a part of receiving hole 8 of cover frame 7, as shown in FIG. 3.

Figure 6:
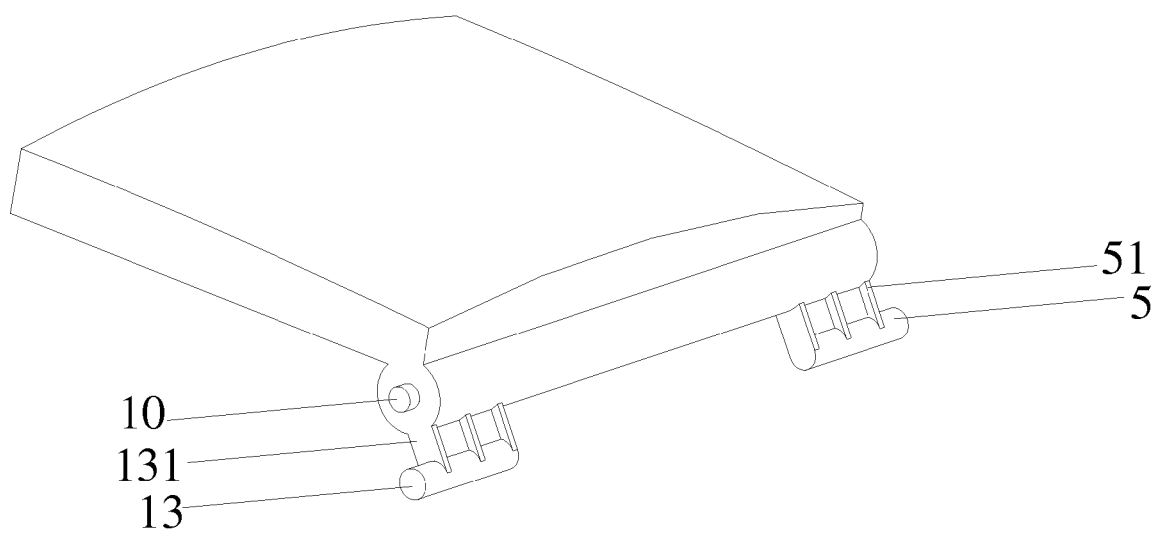
FIG. 6 illustrates a perspective view of a cover of a flip device for vehicle-mounted equipment, according to an embodiment of the present disclosure.

FIG. 6 illustrates a perspective view of a cover according to embodiments of the present disclosure. In some embodiments, the cover disclosed in FIG. 6 can be used as cover 6. As shown in FIG. 6, cover 6 includes pins 10 on a first lateral side and a second lateral side of the cover respectively. Referring to FIG. 2, in some embodiments cover frame 7 also includes pin holes 701 on a first lateral side and a second lateral side of the cover frame respectively. In some embodiments, pins 10 of cover 6 can be pivotably fitted in pin holes 701 of cover frame 7.

Referring back to FIG. 1, in some embodiments slide mechanism 12 is disposed within the housing 16. Slide mechanism 12 can slide along, for example, a front-and-back direction as indicated by arrow A within housing 12. Slide mechanism 12 can also drive cover 6 to flip between a first position to expose at least part of a surface of cover 6, and a second position to cover at least a part of receiving hole 8 of cover frame 7.

In some embodiments, power assembly 2 is mounted within housing 16 to drive sliding mechanism 12 to slide in housing 16. In some embodiments, slide mechanism 12 is coupled with power assembly 2 which allows the power provided by the power assembly 2 to be transferred to slide mechanism 12, thus driving sliding mechanism 12 to slide in housing 16. The sliding of mechanism 12 can then cause cover 6 to flip between a first position to expose at least part of a surface of cover 6, and a second position to cover at least a part of receiving hole 8 of cover frame 7.

With the embodiments of the present disclosure, when an equipment mounted on cover 6 is needed, power assembly 2 can drive cover 6 via sliding mechanism 12 to flip a first position to expose at least part of a surface of cover 6, as shown in FIG. 2, as well as the equipment. When the equipment is not needed, power assembly 2 can also drive cover 6 via sliding mechanism 12 to a second position fold to cover at least a part of receiving hole 8 of cover frame 7, as shown in FIG. 3, as well as the equipment. Therefore, the vehicle-mounted equipment can be more flexibly mounted.

Referring back to FIG. 1, in some embodiments of the present disclosure, power assembly 2 comprises a power unit 18 and a deceleration mechanism 20. In some embodiments, power unit 18 can include an electric motor. In some embodiments, power unit 18 is disposed on a bottom surface of the receiving chamber of housing 16. In some embodiments, deceleration mechanism 20 is also disposed on a bottom surface of the receiving chamber of the housing 16. In some embodiments, deceleration mechanism 20 includes an input end coupled with an output end of power unit, and an output end coupled with slide mechanism 12.

Figure 5:
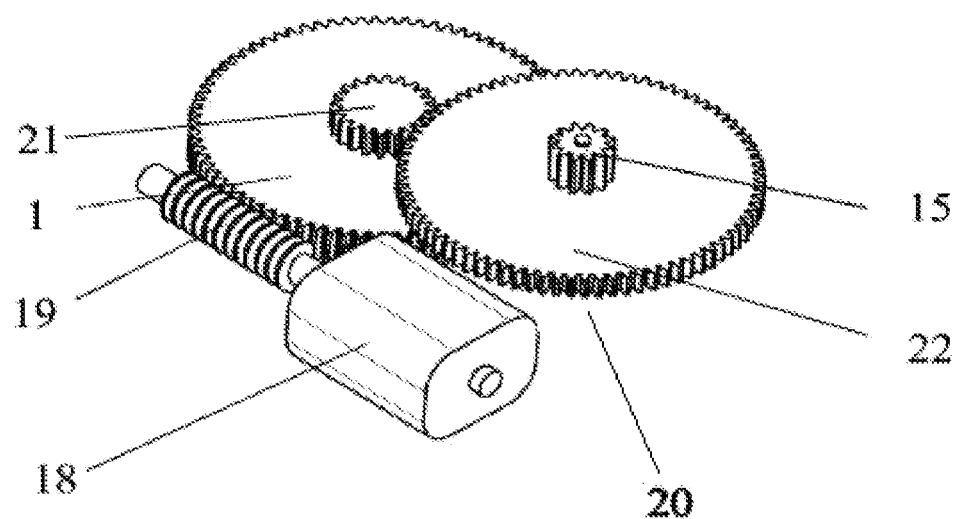
FIG. 5 illustrates a perspective view of a power assembly of a flip device for vehicle-mounted equipment, according to an embodiment of the present disclosure.

Referring to FIG. 5, which illustrates a perspective view of a power assembly, according to embodiments of the present disclosure. The power assembly disclosed in FIG. 5 can be used to implement power assembly 2. Power assembly 2 further includes a worm 19, a first gear 1, a third gear 21, a second gear 22, and a fourth gear 15. In some embodiments, worm 19 is mounted at an output end 19 of power unit 18. In some embodiments, first gear 1 is configured to engage with worm 19. In some embodiments, third gear 21 is coaxial with first gear 1. In some embodiments, first gear 1, worm 19, and third gear 21 are mounted at the input end of the deceleration mechanism 20. In some embodiments, second gear 22 is configured to engage with third gear 21. In some embodiments, fourth gear 15 is coaxial with second gear 22. In some embodiments, second gear 22 and fourth gear 15 are mounted at the output end of deceleration mechanism 20.

Figure 4:
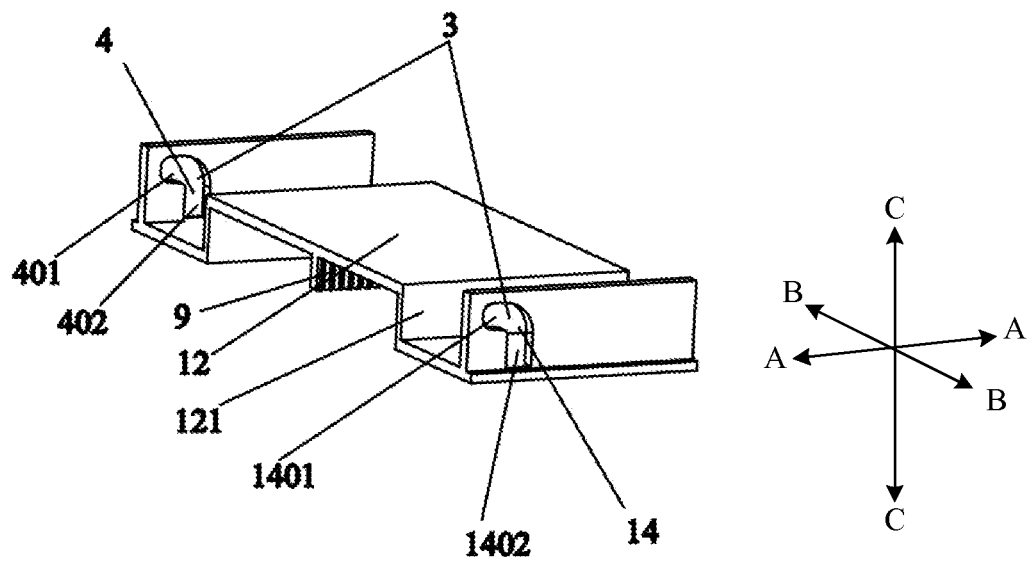
FIG. 4 illustrates a perspective view of a slide mechanism of a flip device for vehicle-mounted equipment, according to an embodiment of the present disclosure.

Referring to FIG. 4, which illustrates a perspective view of a slide mechanism according to an embodiment of the present disclosure. Arrow A shows a first direction (e.g. front and back), arrow B shows a second direction (e.g. lateral), and arrow C shows a third direction (e.g. top and bottom). The slide mechanism disclosed in FIG. 4 can be used to implement slide mechanism 12. As shown in FIG. 4, slide mechanism 12 includes a gear rack 9 which can engage with fourth gear 15 of power assembly 2, which allows power unit 18 to drive slide mechanism 12 to slide within housing 16, via worm 19, first gear 1, second gear 22, third gear 21, fourth gear 15, and gear rack 9.

Referring back to FIGS. 1 and 3. In some embodiments of the present disclosure, housing 16 further includes grooves 17 on the inner sides of the first and second lateral sidewalls of housing 16 respectively. In some embodiments, grooves 17 extend along the sidewalls in a front-back direction, as indicated by arrow A. In some embodiments, two edges of slide mechanism 12 can slidably fit within grooves 17, which allow grooves 17 to guide slide mechanism 12 as it slides within the receiving chamber of housing 16.

Referring to FIGS. 1 to 4, in some embodiments of the present disclosure, mechanism 12 further includes a sliding platform 121. In some embodiments, two edges of sliding platform 121 can slidably fit within grooves 17 of housing 16. In some embodiments, gear rack 9 extends along, for example, a front-back direction as indicated by arrow A, and is disposed on a bottom surface of the sliding platform 121.

Referring to FIG. 1, in some embodiments of the present disclosure, slide mechanism 12 further includes a guiding and position-limiting structure 3. In some embodiments, cover 6 further includes a guiding column structure 601 disposed on the first end of the cover and can slidably fit within guiding and position-limiting structure 3. Such an arrangement allows cover 6 to be guided to flip between a first position to expose at least part of a surface of the cover, and a second position to cover at least a part of receiving hole 8 of cover frame 7, which can then allow the vehicle-mounted equipment mounted on a surface of cover 6 (e.g. a surface facing receiving hole 8) to be displayed or to be concealed respectively.

Referring to FIG. 4, in some embodiments, sliding platform 121 further comprises a substantially inverted U-shaped bracket with a first and second vertical sidewalls. In some embodiments sliding platform 121 further comprises a first horizontal plate, a second horizontal plate, a first vertical side plate, and a second vertical side. In some embodiments, gear rack 9 is mounted on a horizontal surface of the substantially inverted U-shaped bracket. In some embodiments, a first edge the first horizontal plate of sliding platform 121 is connected to a bottom edge of a first vertical sidewall of the U-shaped bracket, while a second edge of the first horizontal plate, opposite to the first edge of the first horizontal plate, can slidably fit within groove 17 of, for example, the first lateral sidewall of housing 16. In some embodiments, a first edge of the second horizontal plate of sliding platform 121 is connected to a bottom edge of a second vertical sidewall of the U-shaped bracket, while a second edge of the second horizontal plate, opposite to the first edge of the second horizontal plate, can slidably fit within groove 17 of, for example, the second lateral sidewall of housing 16. A person with ordinary skill in the art will understand that the terms "horizontal" and "vertical" are used for convenience, that the terms "horizontal" and "vertical" are relative and should not be construed to reflect a particular orientation.

In some embodiments, a bottom edge of the first vertical side plate is connected to one surface of the first horizontal plate and faces the first vertical sidewall of the U-shaped bracket in, for example, a lateral direction indicated by arrow B. In some embodiments, the first vertical side plate is connected to the first horizontal plate in a location away from the second edge of the first horizontal plate, which allows the second edge of the first horizontal plate to slidably fit in groove 17 of, for example, the first lateral sidewall of housing 16. In some embodiments, a bottom edge of the second vertical side plate is connected to one surface of the second horizontal plate and faces the second vertical sidewall of the U-shaped bracket in, for example, a lateral direction indicated by arrow B. In some embodiments, the second vertical side plate is connected to the second horizontal plate in a location away from the second edge of the second horizontal plate, which allows the second edge of the second horizontal plate to slidably fit in groove 17 of, for example, the second lateral sidewall of housing 16.

In some embodiments of the present disclosure, guiding and position-limiting structure 3 of sliding mechanism 12 includes a hole 4, which includes a portion 401, and a portion 402 connected to and forms an angle (e.g. 90 degrees) with portion 401, formed in the first vertical side plate of the sliding platform 121. In some embodiments, structure 3 further includes a hole 14, which includes a portion 1401, and a portion 1402 connected to and forms an angle (e.g. 90 degrees) with portion 1401, formed in the second vertical side plate of the sliding platform 121. In some embodiments, as shown in FIG. 4, hole 4 comprises a first vertical portion 402 and a first horizontal portion 401 connected to an upper end of first vertical portion 402 and can be parallel to grooves 17, and hole 14 comprises a second vertical portion 1402 and a second horizontal portion 1401 connected to an upper end of second vertical portion 1402 and can be parallel to grooves 17. In some embodiments, hole 4 and/or hole 14 have substantially inverted L-shape.

In some embodiments, first horizontal portion 401 of hole 4 and second horizontal portion 1401 of hole 14 can be used to limit the position of cover 6 when the cover is in a second position to cover at least a part of receiving hole 8 of cover frame 7. In some embodiments, first vertical portion 402 of hole 4 and second vertical portion 1402 of hole 14 are used for guiding and causing cover 6 to flip to a first position to expose at least part of receiving hole 8.

In some embodiments, hole 4 further includes a first circular arc transition first horizontal portion 401 and first vertical portion 402. In some embodiments, hole 14 further includes a second circular arc transition between second horizontal portion 1401 and second vertical portion 1402. Such arrangements allows the connection portion between first horizontal portion 401 and first vertical portion 402 of hole 4 to be arc-shaped, and the connection portion between second horizontal portion 1401 and second vertical portion 1402 of hole 14 to be arc-shaped as well, thus facilitating the position-limiting and guiding for cover 6.

Referring to FIGS. 1-3 and FIG. 6, in some embodiments of the present disclosure, guide column structure 601 of cover 6 comprises a first guide column 5 and a second guide column 13. In some embodiments, first guide column 5 includes a first end connected to the first end of cover 6 via a first connecting rod 51, and a second end extending from, for example, a lateral side of cover 6 to slidably fit in hole 4 of sliding mechanism 12. In some embodiments, second guide column 13 includes a first end connected to the first end of cover 6 via a second connecting rod 131, and a second end extending from, for example, another lateral side of cover 6 to slidably fit in hole 14 of sliding mechanism 12.

The operation of a flip device for vehicle-mounted equipment, according to embodiments of the present disclosure, will be briefly described below.

When power is provided by initiating power assembly 2 mounted at the bottom in the receiving chamber of the housing 16, a rotation motion of power assembly 2 can be converted into a linear sliding of slide mechanism 12, via worm 19 which is configured to mesh with deceleration mechanism 20, and then via deceleration mechanism 20 which is configured to mesh with gear rack 9. Furthermore, the flipping and other movements of cover 6 can be realized via the interaction between guiding and position-limiting structure 3 of slide mechanism 12 and guiding column structure 601 of cover 6. Therefore, cover 6 can flip between a first position to expose at least part of a surface of the cover and a second position to cover at least a part of receiving hole 8. A piece of equipment mounted on cover 6 (for example, on a surface of cover 6 facing receiving hole 8) can also be flipped. As result, the vehicle-mounted equipment can extend out of the dashboard of the vehicle when needed, and the equipment can be received in receiving hole 8 when the equipment is not needed. Thus, such an arrangement can open up more space within the interior of the vehicle, since the equipment need not be in an extended position all the time, and the mounting of the vehicle-mounted equipment can become more flexible.

A vehicle according to some embodiments of the present disclosure comprises: a dashboard, a flip device for vehicle-mounted equipment described with reference to the above embodiments, and a vehicle-mounted equipment. Housing 16 of the flip device can be mounted in the dashboard of the vehicle. The vehicle-mounted equipment is mounted on cover 6 of the flip device. The power can be provided by controlling power assembly 2 of the flip device, and sliding mechanism 12 of the flip device can be driven to slide linearly in the housing, thereby the flipping and other motions of cover 6 can be realized via the interaction between guiding and position-limiting structure 3 of slide mechanism 12 and the guiding column structure 601, which can then flip and display (or conceal) the vehicle-mounted equipment.

With such an arrangement, the vehicle-mounted equipment can extend out of the dashboard of the vehicle when needed, and the equipment can be concealed and received in receiving hole 8 of cover frame 7 when the equipment is not needed. Therefore, the mounting of the vehicle-mounted equipment can be made more flexible, and can further improve the comfort and safety of the vehicle, as well as the aesthetic of the interior of the vehicle.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

Also, although throughout the description, various embodiments of this disclosure have been described to be installed in a vehicle's dashboard, or to be used for vehicle-mount equipment, it would be appreciated by those skilled in the art that the embodiments of this disclosure can be used as a standalone device and need not be installed in a vehicle dashboard. It would also be appreciated by those skilled in the art that the embodiments of this disclosure can be used for other devices, or not used for other devices at all, and that the functionality exhibited by the embodiments of this disclosure can be independent from the application of the embodiments.

What is claimed is:

1. A device for moving a vehicle-mounted object, comprising:
    a housing with an opening;
    a cover frame mounted on the housing;
    a cover with a surface for mounting the vehicle-mounted object thereon, the cover being coupled with the cover frame and being capable of pivoting to either expose or cover at least a part of the opening;

a platform slidably fitted within the housing, being coupled with the cover and movable between a first position to cause the cover to pivot to expose at least a part of the opening, and a second position to cause the cover to pivot to cover at least a part of the opening; and a power assembly comprising:
a power unit disposed at a bottom of the housing; and
a transmission disposed at the bottom of the housing and comprising an input end coupled with the power unit and an output end coupled with the platform.

2. The device according to claim 1, wherein the transmission comprises:
a worm coupled with the power unit;
a first gear to mesh with the worm;
a third gear coaxial with the first gear, wherein the first and third gears are disposed at the input end of the transmission;
a second gear to mesh with the third gear; and
a fourth gear coaxial with the second gear, wherein the second and fourth gears are disposed at the output end of the transmission; and
wherein the platform comprises a gear rack to mesh with the fourth gear.

3. The device according to claim 2, wherein a first sidewall of the housing comprises a groove, and wherein an edge of the platform is slidably fitted within the groove.

4. The device according to claim 3, wherein the platform further comprises:
a bracket comprising a second sidewall; and
a first plate being coupled with the bracket and facing the second sidewall of the bracket.

5. The device according to claim 4, wherein the platform further comprises a guiding structure, wherein the cover comprises a guiding column structure to slidably fit within the guiding structure, and wherein the platform is configured to cause the cover to pivot via a motion of the guiding column structure within the guiding structure.

6. The device according to claim 5, wherein the platform further comprises a position-limiting structure connected to the guiding structure to form a guiding and position-limiting structure.

7. The device according to claim 6, wherein the guiding and position-limiting structure comprises a hole formed on the first plate of the platform.

8. The device according to claim 7, wherein the hole comprises a first hole portion and a second hole portion connected to and forming an angle with the first hole portion.

9. The device according to claim 8, wherein the hole further comprises a circular arc transition between the first hole portion and the second hole portion.

10. The device according to claim 8, wherein the guiding column structure comprises a guide column having a first end coupled with the cover, and a second end extending out of a side of the cover to slidably fit in the hole of the platform.

11. The device according to claim 1, wherein the cover frame comprises a pin hole on a side of the cover frame; and
wherein the cover comprises a pin on a side of the cover to be fitted in the pin hole of the cover frame, wherein the cover is capable of pivoting around the pin.

12. A vehicle, comprising:
a dashboard with an opening; and
a device for moving a vehicle-mounted object, comprising:
a housing;
a cover frame mounted on the housing;
a cover with a surface for mounting the vehicle-mounted object thereon, the cover being coupled with the cover frame and being capable of pivoting to either expose or cover at least a part of the opening;
a platform slidably fitted within the housing and being coupled with the cover, the platform being movable between a first position to cause the cover to pivot to expose at least a part of the opening, and a second position to cause the cover to pivot to cover at least a part of the opening; and
a power assembly comprising:
a power unit disposed at a bottom of the housing; and
a transmission disposed at the bottom of the housing and comprising an input end coupled with the power unit and an output end coupled with the platform.

13. The vehicle of claim 12, wherein a surface of the cover frame of the device forms a surface integral to the dashboard.

14. The vehicle of claim 13, wherein a surface of the cover of the device forms a surface integral to the cover frame of the device.

15. The vehicle of claim 12, wherein the platform further comprises:
a gear to engage with the transmission; and a guiding structure;
wherein the cover comprises a guiding column structure to slidably fit in the guiding structure of the platform; and wherein the cover is pivotably mounted in the cover frame;
and wherein the platform is configured to cause the cover to pivot via a motion of the guiding column structure within the guiding structure.

16. A vehicle, comprising:
a dashboard with an opening; and
a device for moving a vehicle-mounted object, comprising:
a housing;
a cover with a surface for mounting the vehicle-mounted object thereon, the cover being coupled with the housing and being capable of pivoting to either expose or cover at least a part of the opening;
a platform slidably fitted within the housing and being coupled with the cover, the platform being movable between a first position to cause the cover to pivot to expose at least a part of the opening, and a second position to cause the cover to pivot to cover at least a part of the opening; and
a power assembly comprising:
a power unit disposed at a bottom of the housing; and
a transmission disposed at the bottom of the housing and comprising an input end coupled with the power unit and an output end coupled with the platform.

17. The vehicle of claim 16, wherein a surface of the cover of the device forms a surface integral to the dashboard.

18. The vehicle of claim 16,
wherein the platform further comprises: a gear to engage with the transmission and a guiding structure;
wherein the cover comprises a guiding column structure to slidably fit in the guiding structure of the platform; and wherein the cover is pivotably coupled with the housing; and
wherein the platform is configured to cause the cover to pivot via a motion of the guiding column structure within the guiding structure.

* * * * *